W. H. BACHTEL.
TIRE.
APPLICATION FILED AUG. 7, 1907.

931,716. Patented Aug. 24, 1909.

Inventor
William H. Bachtel.

Witnesses
Harry C. Rastetter
Sylvia Boron.

By H. W. Bond

Attorney

UNITED STATES PATENT OFFICE.

WILLIAM H. BACHTEL, OF CANTON, OHIO.

TIRE.

931,716.

Specification of Letters Patent.     Patented Aug. 24, 1909.

Application filed August 7, 1907. Serial No. 387,458.

*To all whom it may concern:*

Be it known that I, WILLIAM H. BACHTEL, a citizen of the United States, residing at Canton, in the county of Stark and State of Ohio, have invented certain new and useful Improvements in Tires; and I do hereby declare that the following is a full, clear, and exact description of the same, reference being had to the annexed drawing, making a part of this specification, and to the numerals of reference marked thereon, in which—

Figure 1:
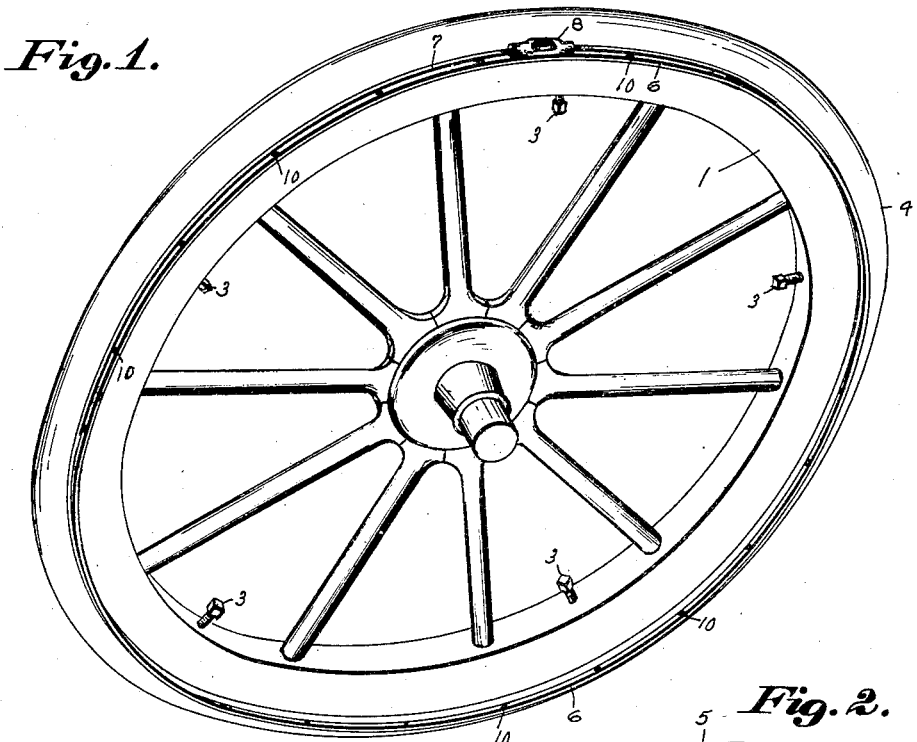
Figure 2:
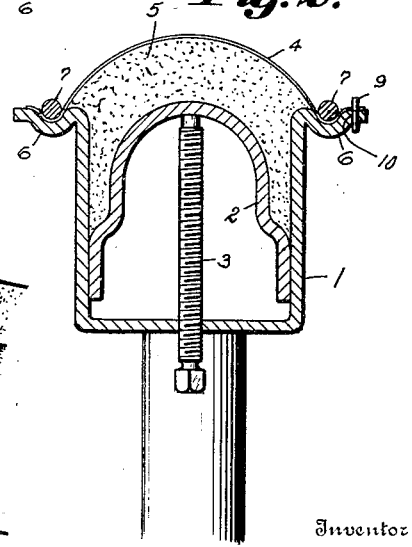
Figure 3:
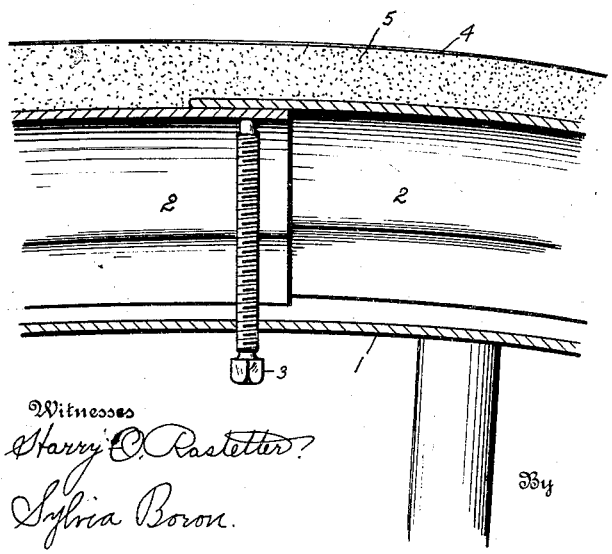

Figure 1 is a perspective view showing the tire properly attached to a wheel. Fig. 2 is a transverse section of the wheel felly showing the tire properly connected. Fig. 3 is a longitudinal section showing a portion of the tire, showing the different parts properly connected.

The present invention has relation to tires, especially designed for automobiles and bicycles, or cushioned tires for any class of vehicles, and it consists in the novel arrangement hereinafter described and particularly pointed out in the claim.

Similar numerals of reference indicate corresponding parts in all the figures of the drawing.

In the accompanying drawing, 1 represents the wheel felly which is preferably of the form shown in the drawing, and in this instance is preferably formed of metal and its periphery provided with grooved flanges 6, which flanges are located substantially as shown in the drawings. Within the felly 1 are located any desired number of segmental followers 2, which segmental followers are located in the felly and held in fixed adjustment by the set screws 3, the contact ends of which abut against the inner faces of the follower sections 2. The set screws 3 are formed of sufficient length to extend through the felly 1, which felly is provided with screw threaded apertures, through which the screws pass.

It will be understood that by rotating the set screws 3 in one direction the followers will be forced outward or away from the center of the wheel, thereby expanding the diameter of the circle inclosed by the segmental sections 2. Upon the segmental sections 2 and in contact therewith is located the cushion filling 5, which may be of any suitable material such as cork whereby the proper resiliency is produced, which cork or like material is located between the segmental follower sections 2 and the outer tread or cover 4, which outer tread covering is preferably formed of heavy canvas, leather or like material, such as commonly used in tires of this kind. In use the segmental sections 2 are placed in proper relative position with reference to the felly 1, after which the cushion or resilient material is placed upon the outer surfaces of the segmental followers 2. The tread strip 4 is then placed in proper position and held upon the felly by means of the grooved flanges 6 and the clamping rings or bands 7, which clamping rings or bands are partially seated in the grooves formed in the flanges 6, the tread strip coming between the grooved flanges and the clamping rings or bands 7.

For the purpose of properly clamping the tread strip 4 the clamping rings or bands are each provided with the turn buckle 8, or their equivalents. In connecting the tread strip 4 one edge of the strip is connected to one of the grooved flanges by means of the clamping ring or band after which said strip is stretched over the resilient material 5 and may be temporarily held by the pins 9, which pins are passed through apertures 10 formed in the flange 6 after which the second clamping ring or band is placed in position and properly clamped, thereby securely connecting and clamping the tread strip to the felly 1.

It will be understood that by my peculiar arrangement I am enabled to keep the tread strip 4 properly stretched at all times and under all circumstances by the adjustment of the follower sections 2, and I am also enabled to compress the material located between the follower sections and the tread strip, thereby producing a firm but yielding tread for the vehicle wheel proper. Another beneficial result obtained by the adjustment of the follower sections 2, is I am enabled to give the tread strip 4 any desired tension and at the same time compress the material lying between the follower sections and the tread strip. This is of importance, owing to the fact that the tension varies from time to time, either from atmospheric causes or from use.

It is well understood that in use the resilient material which receives the thrust becomes more compact from use, thereby releasing the tension of the tread strip 4, but by providing means for adjusting the follower, different degrees of tension are provided for under all circumstances and conditions. The follower sections should be so formed that when they are placed in the felly there will be no loose motion as between said sections and the felly, but said follower sections should be so adjusted as to size, that they are free to be moved by the set screws 3. It will be understood that the set screws 3 should be formed of sufficient strength to form the proper backing for the follower sections 2. The different parts of the tire proper can be easily assembled owing to the fact that the felly is an open channel, thereby allowing for the easy introduction of the follower member or members 2 and also the yielding filling after which the tread strip 4 can be easily adjusted.

By locating the followers 2 in the channeled felly 1 and spacing the outer faces of the segmental followers from the inner faces of the felly 1 beyond their contact points, and by placing the resilient material as shown, that is to say between the inner faces of the felly and the outer spaced faces of the followers, a better cushion is produced, owing to the fact that the resilient material is extended for a considerable distance against the inner faces of the felly 1 and by the outward movement of the segmental follower sections the resilient material will be forced laterally compressing the resilient material in lateral lines.

Having fully described my invention, what I claim as new and desire to secure by Letters Patent, is—

In combination, a channel felly, said felly provided with lateral curved flanges, segmental follower sections located in the channel of the felly, said follower sections provided with felly contact portions, said contact portions extended at their inner edges, a resilient material located upon the segmental follower sections, and in contact with the inner faces of the channel felly, a tread-strip located upon the resilient material, means for holding the tread-strip in contact therewith, and means for adjusting the segmental follower sections, substantially as and for the purpose set forth.

In testimony that I claim the above, I have hereunto subscribed my name in the presence of two witnesses.

WILLIAM H. BACHTEL

Witnesses:
F. W. BOND,
SYLVIA BORON.